US012100375B2

(12) United States Patent
Frederick et al.

(10) Patent No.: US 12,100,375 B2
(45) Date of Patent: *Sep. 24, 2024

(54) APPARATUS AND METHODS FOR GENERATING MUSIC

(71) Applicant: inMusic Brands, Inc., Cumberland, RI (US)

(72) Inventors: Mark A Frederick, Bristol, RI (US); Walter P. Skorupski, Cranston, RI (US); John Alex Souppa, Ashland, MA (US); John E. O'Donnell, Fort Lauderdale, FL (US)

(73) Assignee: inMusic Brands, Inc., Cumberland, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,319

(22) Filed: Aug. 16, 2021

(65) Prior Publication Data

US 2021/0375244 A1 Dec. 2, 2021

Related U.S. Application Data

(63) Continuation of application No. 16/515,237, filed on Jul. 18, 2019, now Pat. No. 11,100,907.

(51) Int. Cl.

| | |
|---|---|
| ***G10H 1/00*** | (2006.01) |
| ***G10H 1/34*** | (2006.01) |
| ***G10H 1/46*** | (2006.01) |

(52) U.S. Cl.

CPC ......... *G10H 1/0033* (2013.01); *G10H 1/0008* (2013.01); *G10H 1/348* (2013.01); *G10H 1/46* (2013.01); *G10H 2220/096* (2013.01); *G10H 2220/116* (2013.01); *G10H 2240/325* (2013.01)

(58) Field of Classification Search

CPC ...... G10H 1/0033; G10H 1/46; G10H 1/0008; G10H 1/348; G10H 2220/096; G10H 2220/116; G10H 2240/325

See application file for complete search history.

(56) References Cited

U.S. PATENT DOCUMENTS

| | | | | |
|---|---|---|---|---|
| 8,324,494 B1 * | 12/2012 | Packouz | G10H 1/42 | 84/746 |
| 8,957,297 B2 * | 2/2015 | Urry | G10H 1/06 | 84/744 |
| 2004/0159222 A1 * | 8/2004 | Pennock | G10H 1/02 | 84/662 |
| 2010/0269670 A1 * | 10/2010 | O'Connor | G10H 1/348 | 84/746 |

(Continued)

OTHER PUBLICATIONS

Singular Sound Announces the Aeros Loop Studio Pedal, Kevin Johnson, notreble.com, posted Jul. 18, 2019.*

(Continued)

*Primary Examiner* — Jeffrey Donels

(74) *Attorney, Agent, or Firm* — ARENTFOX SCHIFF LLP

(57) ABSTRACT

A guitar pedalboard for creating a loop includes a touch screen display for displaying a plurality of tracks of a loop. The touch screen display can be used to adjust a parameter of each track, and the loop. A plurality of footswitches corresponding to the plurality of tracks can be used to independently record and play each track of the loop.

21 Claims, 16 Drawing Sheets

(56) References Cited

U.S. PATENT DOCUMENTS

| | | | | |
|---|---|---|---|---|
| 2011/0299238 A1* | 12/2011 | Radin | G06F 3/165 | 361/679.41 |
| 2013/0154920 A1* | 6/2013 | Radin | G10H 1/348 | 345/156 |
| 2013/0201398 A1* | 8/2013 | Radin | H03G 5/025 | 381/1 |
| 2013/0327201 A1* | 12/2013 | Urry | G10H 1/348 | 84/626 |
| 2017/0025108 A1* | 1/2017 | Packouz | G10H 1/0066 | |
| 2019/0066643 A1* | 2/2019 | Packouz | G10H 1/42 | |
| 2020/0126528 A1* | 4/2020 | Packouz | G10H 1/348 | |

OTHER PUBLICATIONS

Aeros Loop Studio Manual, Singular Sound, retrieved from internet May 21, 2023.*

Garageband '09 Getting Started, apple.com, 2009.*

* cited by examiner

200

300

APPARATUS AND METHODS FOR GENERATING MUSIC

TECHNICAL FIELD

This disclosure relates generally to the field of music production. More specifically, and without limitation, this disclosure relates to a device, such as a guitar pedalboard, for music production that enables users to record, edit, and play multiple audio tracks.

BACKGROUND

A device for music production, such as a guitar pedalboard, may allow users to record a loop on the spot by plugging in instruments such as guitar, mic, keyboard, drum, and etc. Musicians use the recorded loop as accompaniment for further live playing and/or singing. Such a device may also be used for overdubbing new performances while the loop plays. Current devices, however, are limited in terms of functionality and manipulation of multiple tracks of audio.

SUMMARY

One illustrative aspect of the present disclosure is directed to a guitar pedalboard. The pedalboard may include a touch screen display, one or more configurable controls, knobs, and switches. The device may further include one or memory for storing an operating system with a built-in application and one or more processors. The processors receive one or more transaction requests on corresponding tracks from the corresponding switches and execute the received requests independently on the tracks. The transaction may include recording, overdubbing, playing, stopping or muting the tracks.

Another illustrative aspect of the present disclosure is directed to method for music production. The method may include receiving one or more transaction requests on corresponding tracks from the corresponding switches and executing the received requests independently on the tracks. The transaction may include recording, overdubbing, playing, stopping or muting the tracks.

Additional objects and advantages of the present disclosure will be set forth in part in the following detailed description.

It is to be understood that the foregoing general description and the following detailed description are exemplary and explanatory only and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
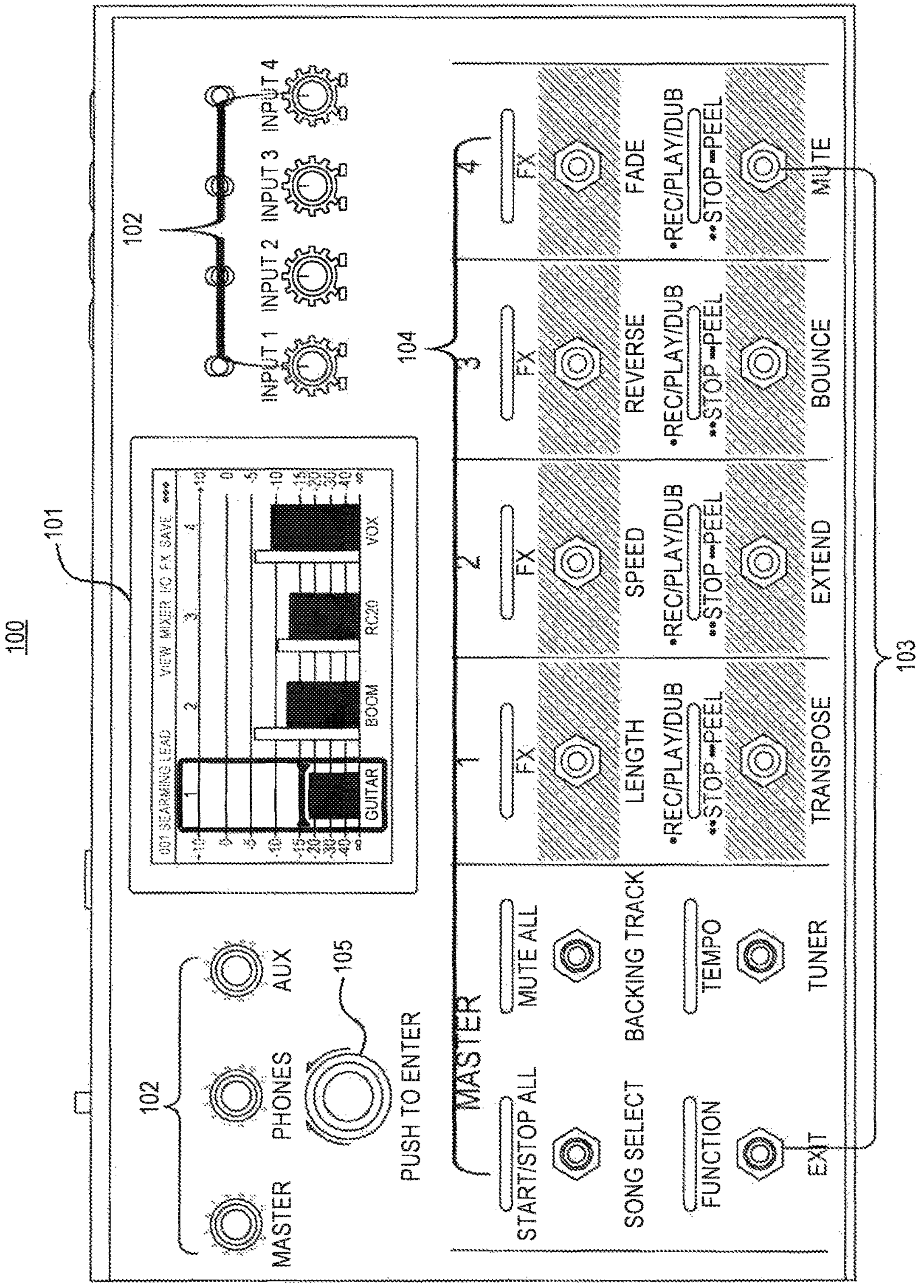
FIG. 1 is a top plan view of an exemplary guitar pedalboard for creating music, consistent with the present invention.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to a guitar pedalboard for music production. The disclosed embodiments provide innovative technical features that allow users to record and play a loop. The loop is composed of independent tracks, wherein each of the track may have up to 99 layers. The independent tracks allow user to record, overdub, play, stop and mute tracks independently of each other. For example, a user may mute Track 1 and Track 2, and play Track 3 while recording Track 4. As used herein, a "track" may refer to the collection of clips, that are short sequences of audio, drum, plugin, keygroup, MIDI, and CV.

FIG. 1 is a top view of an exemplary guitar pedalboard 100 for producing music, consistent with the principles of the present invention. As shown, pedalboard 100 may include a touch screen display 101, one or more configurable controls 102, one or more footswitches 103, one or more switch indicators 104, and an encoder 105.

A touch screen 101, in some embodiments, may be implemented to enable users to interact with functionalities of pedalboard 100. For example, in embodiments where pedalboard 100 presents user interfaces to enable users to make desired configurations, touch screen 101 may be implemented as a component for user interaction by capturing configurations made by a user's finger on a presence sensitive input mechanism. Touch screen 101 may also display various kinds of information and status of the pedalboard 100. Touch screen 101 may also include, for example, a liquid crystal display (LCD), a light emitting diode screen (LED), an organic light emitting diode screens (OLED), or other known display screens. An illustrative set of user interfaces, illustrated by FIGS. 2, 3, 4, 5, 6, 7, 8, and 9 will help to describe some of operations of touch screen 101 and is discussed below.

Configurable controls 102, in some embodiments, may be implemented to enable users to adjust an independent gain level of each input, a volume level of the outputs, and a volume level of auxiliary input. For example, in embodiments where configurable controls 102 enable users to adjust various settings, the users may turn the controls 102 clockwise or counter-clockwise to meet the dedicated outcomes.

Footswitches 103, in some embodiments, may be implemented to enable pedalboard 100 for triggering various transactions. The transactions may include recording, overdubbing, playing, stopping or muting. Some footswitches 103 may correspond to tracks for triggering the transactions the tracks and the remainder of the footswitches 103 may be assigned for triggering the transactions on all tracks. For example, an exemplary pedalboard 100 in FIG. 1 displays the eight right-most switches that correspond to the four tracks and the remainder of switches control transactions on all tracks. More than one switches may be triggered to apply various transactions on the corresponding tracks. An exemplary usage of footswitches 103 is discussed below.

Each of switch indicators 104 may correspond to one of footswitches 103. Switch indicators 104 may include lights to indicate a status of different transactions operating on the corresponding footswitches 103. For example, an exemplary pedalboard 100 in FIG. 1 displays each of switch indicators 104 disposed above corresponding footswitches 103. The lights on switch indicators 104 may indicate the status of different transactions operating on the switch below each one.

Encoder 105, in some embodiments, may be implemented to enable users to scroll through the available menu options or adjust the parameter values of the selected field in the display 101. Encoder 105 may be pushed to confirm the selection. For example, in embodiments where pedalboard 100 presents user interfaces for encoder 105 to scroll through the available menu options or adjust the parameter values of the selected field on the display 101, users may turn the encoder 105 to scroll or adjust and push it to confirmer their selection.

Figure 1A:
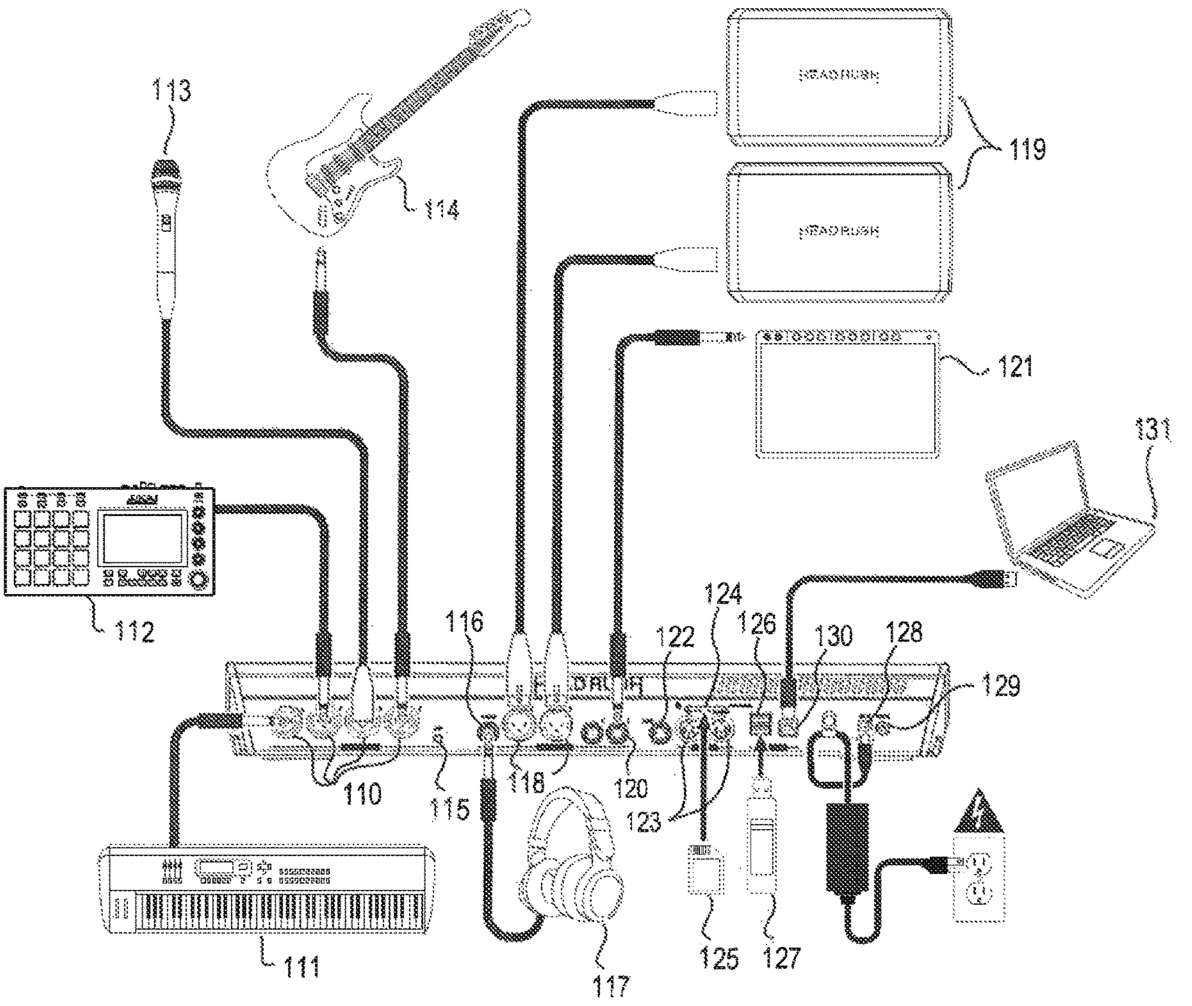
FIG. 1A is shows the rear panel connections of the guitar pedalboard of FIG. 1 in one possible configuration of intended use.

FIG. 1A shows the rear panel connections of the pedalboard 100 in one possible configuration. Audio inputs 110 can be connected to various audio sources. The inputs may receive, for example, XLR or TRS cables. In the illustrative embodiment of FIG. 1A, inputs 110 are connected to audio sources including keyboard 111, drum machine 112, microphone 113, and guitar 114. Auxiliary input 115 may provide a connection to an optional audio source such as a smartphone or tablet. Auxiliary input may be compatible with a ⅛"/3.5 mm TRS cable. Output 116 provides a connection to headphones 117. Outputs 118 connect to speakers 119, or some other device such as a mixer. In the foregoing embodiment the outputs are XLR but other connections could be used. Outputs 120 connect to amplifier 121. Outputs 120 connect to ¼"/6.35 mm TRS cables but other connections could be used. Input 122 is for connection to an optional expression pedal.

SD card slot 124 is for receiving an SD card 125 which can be used to import or export loops to or from the pedalboard. Input 123*a* is for receiving a standard MIDI cable which is the MIDI output of an external MIDI device. Output 123*b* is for receiving a standard MIDI cable to connect to the MIDI input of an external MIDI device. Output 123*b* can be set up to be a standard MIDI output or MIDI throughput. USB type-B port 130 is used to connect to a computer 131 using a standard USB cable. This connection allows the pedalboard to send and receive digital audio signals to and from a computer. This connection can also be used to import or export loops, individual audio files, backing tracks, etc. This connection may also be used to update the pedalboard firmware. USB type-A ports 126 may be used to connect to a USB flash drive 127 to import or export loops to or from the pedalboard. The rear panel also includes a power input 128 and power switch 129.

Processor (not pictured) may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems. The disclosed embodiments are not limited to any type of processor(s) configured in computing device 100. It should be understood, however, that processor, in some embodiments, may be particularly adapted and configured to perform steps related to the computer implemented pedalboard for music production. For example, processor may include an ability to handle two different transactions simultaneously and independently on two different tracks.

Memory (not pictured) may be, for example, a magnetic, semiconductor, tape, optical, removable, non-removable, or other type of storage device or tangible (i.e., non-transitory) computer-readable medium. Memory may store operating system, as well as data and applications for performing operations consistent with functions described below.

Operating system may perform known operating system functions when executed by processor. By way of example, the operating system may include Android™, Apple OS X™, Unix™, Linux™, or others. Accordingly, examples of the disclosed invention may operate and function with computer systems running any type of operating system having an inbuilt application.

Memory may include one or more memory devices that store data and instructions used to perform one or more features of the disclosed embodiments. For example, memory may represent a tangible and non-transitory computer-readable medium having stored therein computer programs, sets of instructions, code, or data to be executed by processor. Memory may include, for example, a removable memory chip (e.g., EPROM, RAM, ROM, DRAM, EE PROM, flash memory devices, or other volatile or nonvolatile memory devices) or other removable storage units that allow instructions and data to be accessed by processor.

Memory may also include instructions that, when executed by processor, perform operations consistent with the functionalities disclosed herein. Devices consistent with disclosed embodiments are not limited to separate programs or computers configured to perform dedicated tasks. For example, memory may include one or more programs to perform one or more functions of the disclosed embodiments. By way of further example, program may include HEADRUSH Software or others.

Figure 2:
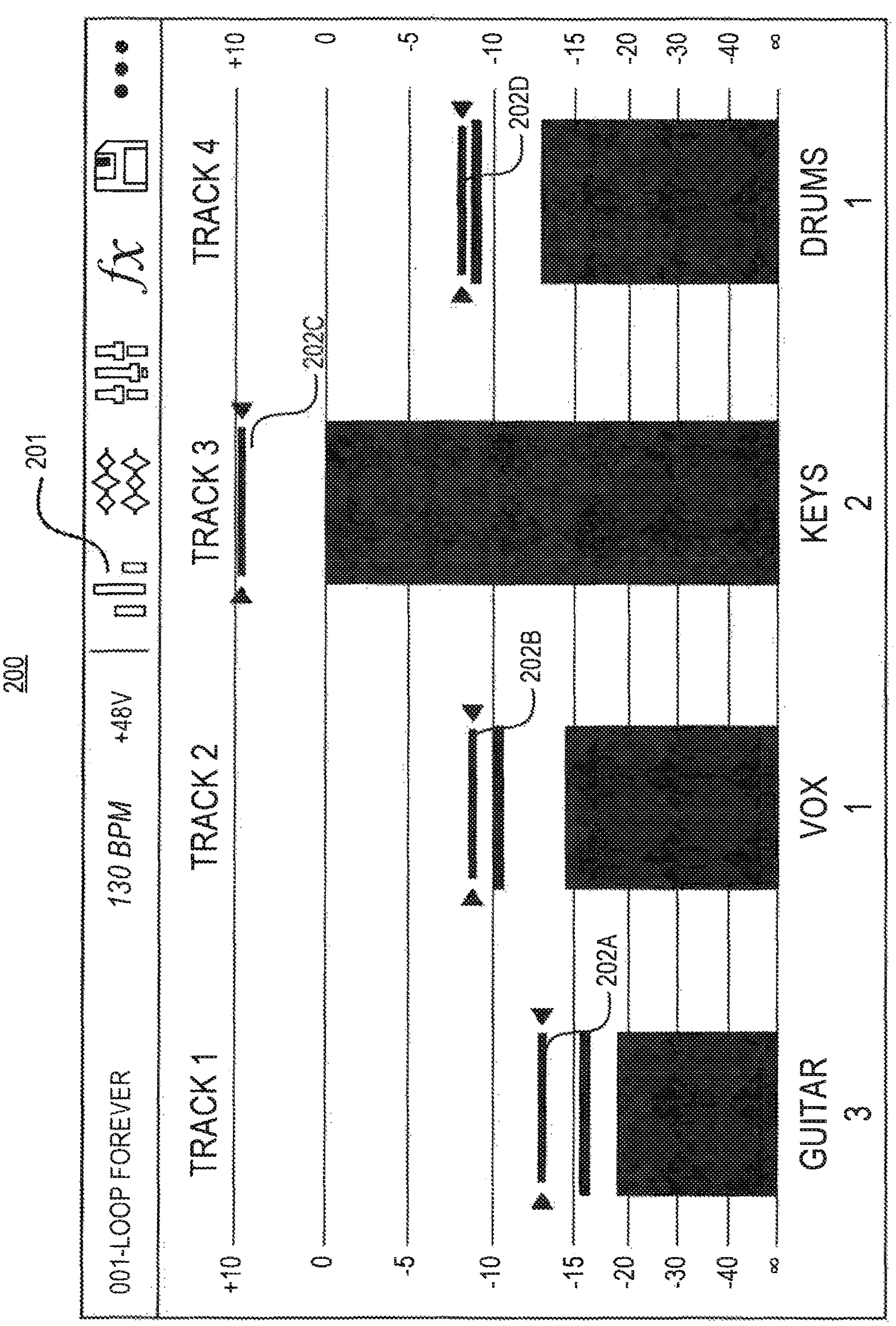
FIG. 2 shows an exemplary user interface of the guitar pedalboard of FIG. 1 for adjusting a volume level of the tracks.

FIG. 2 shows an exemplary user interface 200 of the pedalboard 100 for adjusting a volume level of the tracks. Pedalboard 100 may generate a Meter page (e.g., FIG. 2) by receiving a press on icon 201. The Meter page, in some embodiments, enables users to adjust the volume of each track. For example, pedalboard 100 may capture adjusted volume levels of each track based on a configuration of bar representations 202A-D. The bar 202A may be configured by a user's finger on a presence sensitive input mechanism (e.g., a touch-screen device).

Pedalboard 100 may perform various functions based on a configuration of footswitches 103 corresponding to a track or all tracks. The functions may include recording a track, finishing recording and starting playback of a track, overdubbing on a track that is currently playing, stopping a track or all tracks at any point, playing a track, starting playback of all tracks simultaneously, undoing everything, re-adding everything a user recorded since the recording, playing, or overdubbing operation, and re-adding everything a user just undid. For example, a user may press a switch to record a track corresponding to the switch and press another switch to overdub on another track that is currently playing. Pedalboard 100 may route audio inputs to the two tracks above for recording and overdubbing by capturing user inputs on a user interface. The user interface for routing audio inputs is discussed below with respect to FIG. 7. By way of further example, the user may press a switch to stop recording the track while keep overdubbing on the other track because various functions can be triggered independently on the tracks.

Figure 3:
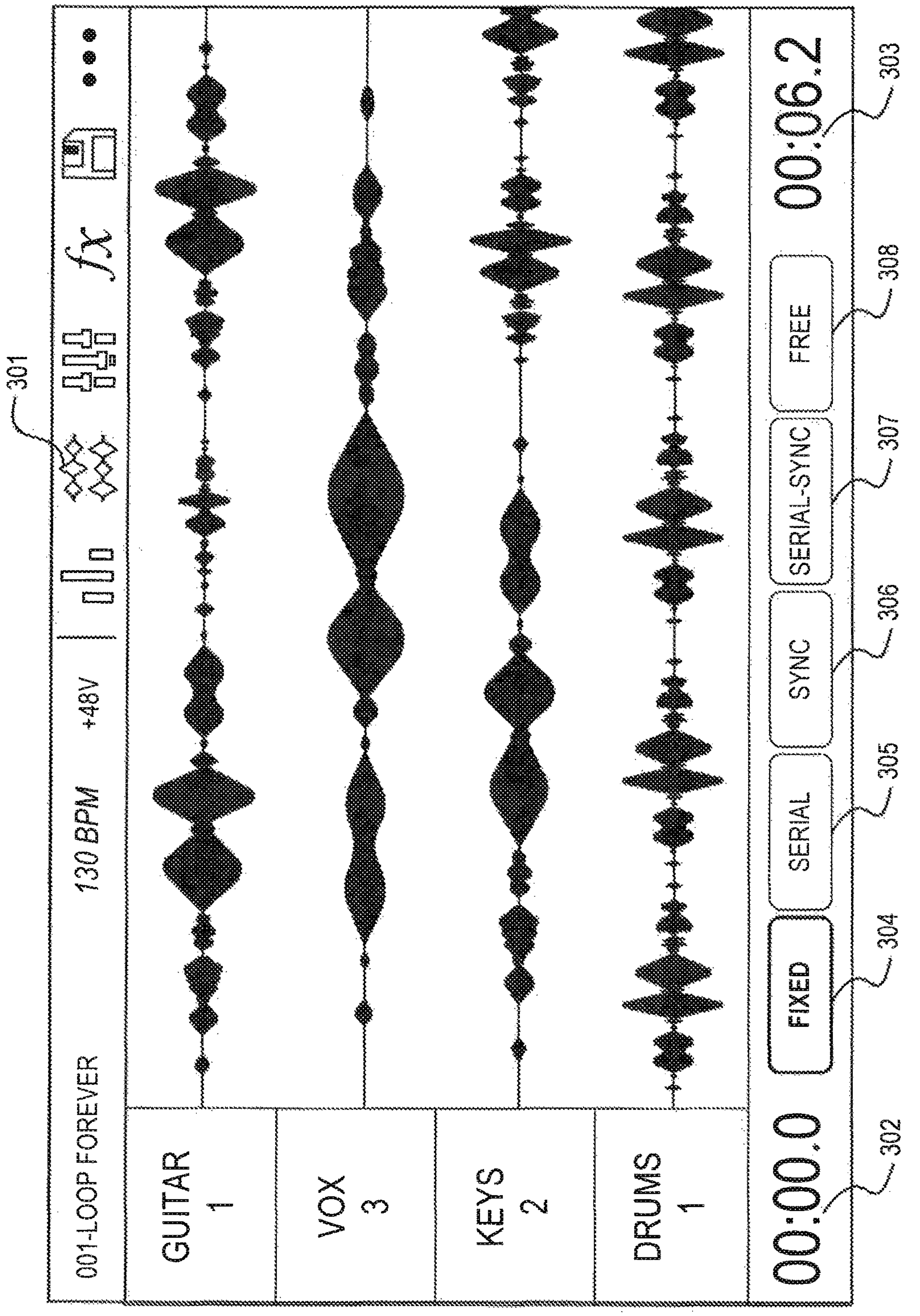
FIG. 3 shows an exemplary user interface of the guitar pedalboard of FIG. 1 for viewing waveforms of the tracks in a loop.

FIG. 3 shows an exemplary user interface 300 of the pedalboard 100 for viewing waveforms of the tracks in a loop. Pedalboard 100 may generate a Timeline page (e.g., FIG. 3) by receiving a press on icon 301. The Timeline page, in some embodiments, presents waveforms of the tracks in a loop and time counters to indicate the current playback position of the loop and the length of the longest track in the loop. For example, exemplary user interface 300 displays time counter 302 in the lower-left corner indicating the current playback position of the loop and another time counter 303 in the lower-right corner indicating the length of the longest track in the loop. Both counters are displayed as minutes:seconds:deciseconds.

Timeline page, moreover, may enable users to configure how the pedalboard 100 records, overdubs, or plays tracks. The exemplary user interface of FIG. 3 depicts five different track modes for pedalboard 100 to record, overdub, and play tracks. In some embodiments, pedalboard 100 enables a user to select a mode using a pressure-sensitive input mechanism (e.g., a touch-screen device) or any other appropriate selection mechanism. For example, user may press a button 304 for using Fixed Mode for pedalboard 100 to record, overdub, and play the tracks.

Pedalboard 100, in some embodiments, may be implemented for using Fixed Mode, allowing tracks to have the same length. While in Fixed Mode, pedalboard 100 may record, overdub, or play all tracks simultaneously when the configuration is received from the user interface 300, wherein all track lengths may be the same length as the first recorded track. The configuration may be received from the user interface 300 when the users press a button 304. Moreover, when the switch for recording, overdubbing, or playing is triggered on a track, it will start immediately in Fixed Mode.

In some embodiments, pedalboard 100 may be implemented for using Serial Mode, enabling each of the tracks as a different section of a song (e.g., verse, chorus, bridge, and outro). While in Serial Mode, pedalboard 100 may record, overdub, or play on only one track at a time and the tracks can be different lengths. The Serial Mode may be triggered when the configuration is received from the user interface 300. For example, a user may press a button 305 for triggering using Serial Mode. Moreover, when the switch for recording, overdubbing, or playing is triggered on a track, it will begin when the playhead has reached the end of the loop and starts at the beginning again in Serial Mode.

Pedalboard 100, in some embodiments, may be implemented for using Sync Mode, using tracks with different lengths to always stay in sync. While in Sync Mode, pedalboard 100 may record or play multiple tracks simultaneously but a reference track must be recorded first. After the reference track has been recorded, all other tracks must be the same lengths, or a multiple of its lengths. If new tracks are shorter or longer than the reference track, pedalboard 100 will automatically quantize them to keep them in sync with the reference track. The Sync Mode may be triggered when the configuration is received from the user interface 300. For example, a user may press a button 306 for triggering using Sync Mode. Moreover, when the switch for recording, overdubbing, or playing is triggered on a track, it will begin doing so when the playhead has reached the end of the loop and starts at the beginning again in Sync Mode.

In some embodiments, pedalboard 100 may be implemented for using Serial-Sync Mode, enabling users to keep reference track (e.g., a drum or percussion track) playing at all times while switching between different song sections on other tracks (e.g., verse, chorus, and bridge). While in Serial-Sync Mode, pedalboard 100 may play, record, or overdub a reference track and only one other track at the same time. The reference track must be recorded first. After the reference track has been recorded, all other tracks must be the same lengths, or a multiple of its length. Pedalboard 100 may auto-trim (or extend) the endpoints of the other tracks to always keep tracks in sync. The Serial-Sync Mode may be triggered when the configuration is received from the user interface 300. For example, a user may press a button 307 for triggering using Serial-Sync Mode. Moreover, when the switch for recording, overdubbing, or playing is triggered on a track, it will begin doing so when the playhead has reached the end of the loop and starts at the beginning again in Serial-Sync Mode.

Pedalboard 100, in some embodiments, may be implemented for using Free Mode for recording, overdubbing, or playing all tracks simultaneously. All tracks can be different lengths. Free Mode may be triggered when the configuration is received from the user interface 300. For example, a user may press a button 308 for triggering using Free Mode. Moreover, when the switch for recording, overdubbing, or playing is triggered on a track, it will start immediately in Free Mode.

Figure 4:
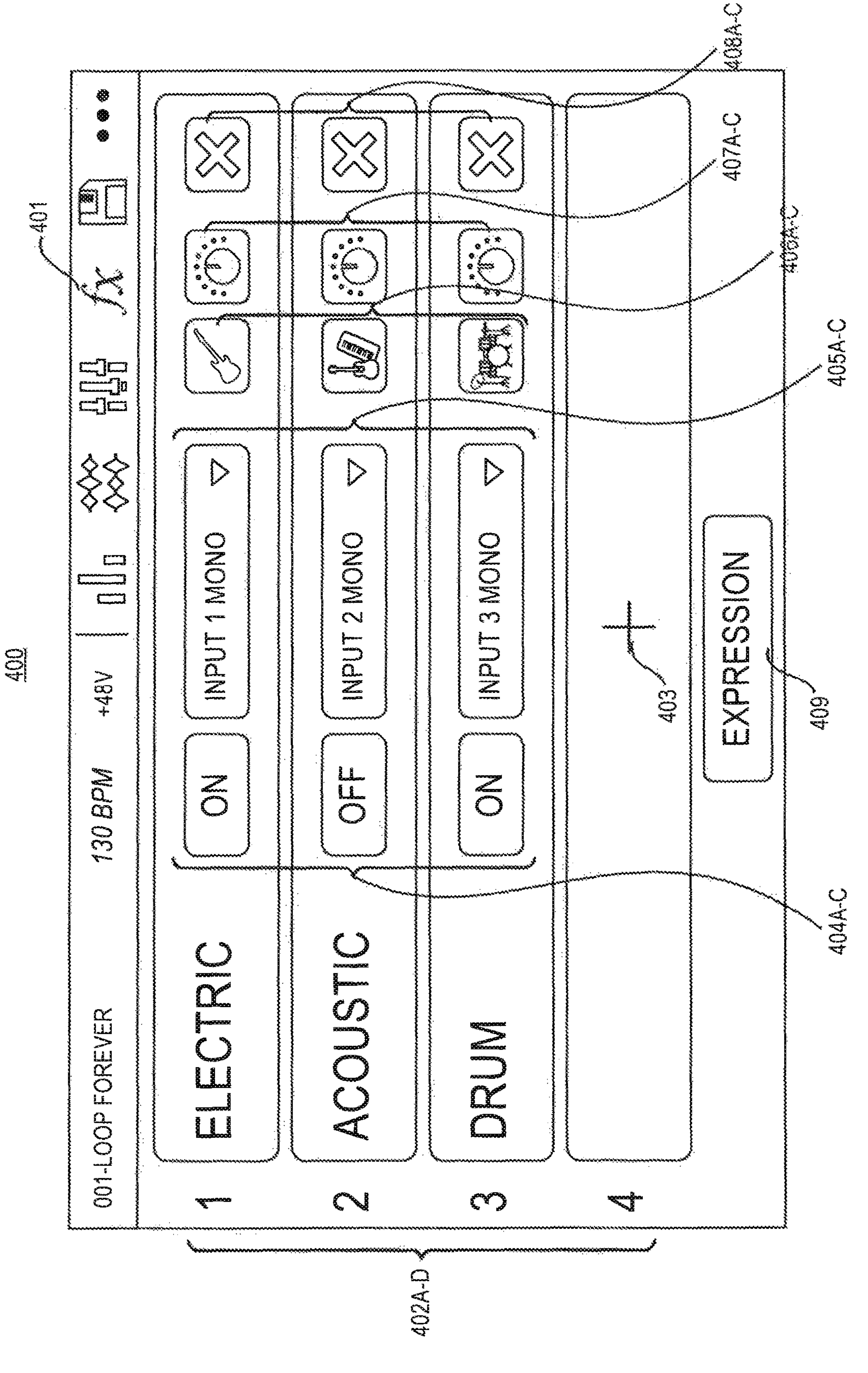
FIG. 4 shows an exemplary user interface of the guitar pedalboard of FIG. 1 for assigning multiple effects to an audio input or each of tracks.

FIG. 4 shows an exemplary user interface 400 of the pedalboard 100 for assigning multiple effects to an audio input or each of tracks. Pedalboard 100 may generate a FX Page (e.g., FIG. 4) by receiving a press on icon 401. The exemplary user interface 400 includes FX racks 402A-D and each of the FX racks 402A-D may include multiple effects configurations. The configurations may include enabling or bypassing an effect, setting the target audio for the effect, changing a type of multiple effects, changing the settings of multiple effects, and removing an FX rack. The FX page, in some embodiments, enables users to assign or remove the multiple effects to an audio input or each track. The multiple effects may be independently edited and toggled for each of the FX racks 402A-D on the user interface 400. For example, in the exemplary user interface 400, each of the FX racks 402A-D contains distinct multiple effects configurations. The FX page may be configured by a user's finger on a presence sensitive input mechanism (e.g., a touch-screen device). The distinct configurations for each of the FX racks 402A-D are discussed below.

FX page may enable users to add FX racks. The exemplary user interface of FIG. 4 depicts a button 403 for adding fourth FX rack 402D. The users may press the button 403 if they want to add an FX rack 402D.

FX page may allow users to enable or bypass an effect. For example, users may press selectable elements 404A-C to enable or bypass an effect on FX racks 402A-C. The exemplary user interface of FIG. 4 depicts that effects of FX racks 402A and 402C are enabled as the elements 404A and 404C display "ON" while the effect of FX rack 402B is bypassed as the element 404B displays "OFF". The users, also, may tap the corresponding footswitches 103 to enable or bypass an effect for FX racks 402A-D.

FX page may enable users to set the target audio for the effect. For example, users may tap dropdown menu 405A-C and select inputs or tracks to assign the FX rack to the selected inputs or tracks. The exemplary user interface of FIG. 4 depicts FX rack 402A is assigned to INPUT 1 MONO, selected by the dropdown menu 405A, FX rack 402B is assigned to INPUT 2 MONO, selected by the dropdown menu 405B, and FX rack 402C is assigned to INPUT 3 MONO, selected by the dropdown menu 405C. The multiple effects configurations of each of the FX racks are applied to the selected inputs or tracks. For example, in the exemplary user inter face of FIG. 4, FX rack 402A is assigned to INPUT 1 MONO so its enabled 404A and electric 406A effect is applied to the INPUT 1 MONO.

FX page may enable users to change a type of multiple effects. For example, users may tap icons 406A-C and change the type of multiple effects. The exemplary user interface of FIG. 4 depicts "ELECTRIC" as the type of multiple effects of FX rack 402A, represented by the guitar symbol. Similarly, the type of multiple effects of FX rack 402B is "ACOUSTIC" and the type of multiple effects of FX rack 402C is "DRUM". For example, users may tap icon 406A to change the type of multiple effects of FX rack 402A from "ELECTRIC" to other types such as "ACOUSTIC" and "DRUM" in the exemplary user interface of FIG. 4.

FX page may enable users to change the settings of multiple effects. For example, users may tap knob icons 407A-C to change the settings for multiple effects.

FX page may enable users to remove FX racks. For example, users may tap icons 408A-C to remove FX racks 402A-C in the exemplary user interface of FIG. 4. The button 403 may replace FX racks 402A-C if the users tap the corresponding icons 408A-C.

FX page may enable users to assign FX parameters to an external expression. For example, users may press on button 409 to assign FX parameters to an external expression pedal.

Pedalboard 100 may present user interfaces to users, enabling the users to control where input, track, and output audio signals are sent. For example, pedalboard 100 may capture settings based on configurations made on the user interfaces. The user interface may be configured by a user's finger on a presence sensitive input mechanism (e.g., a touch-screen device).

Figure 5:
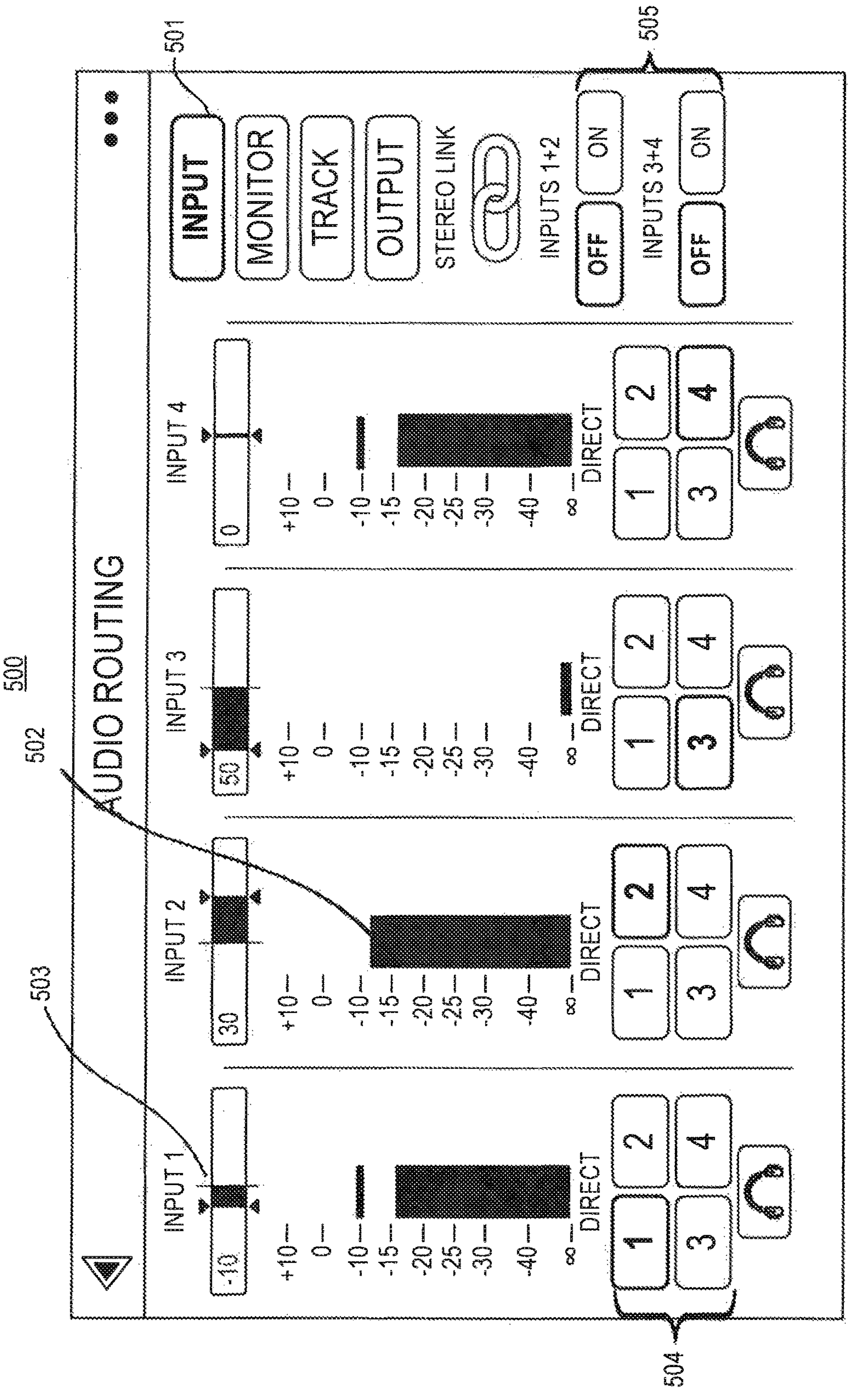
FIG. 5 shows an exemplary user interface of the guitar pedalboard of FIG. 1 displaying a page to control audio inputs.

FIG. 5 shows an exemplary user interface 500 of the pedalboard 100 displaying a page to control audio inputs. Pedalboard 100 may generate an Input page (e.g., FIG. 5) by receiving a press on icon 501. The Input page, in some embodiments, enables users to control audio inputs. For example, pedalboard 100 may capture settings based on configurations made on the user interface 500 to control audio inputs. The inputs may be controlled by user interface 500 or controls 102.

Input page may enable users to adjust a level of an audio input by adjusting control 102 corresponding to the input. For example, users may turn a corresponding control 102 clockwise to increase the level of an audio input and turn the knob 102 counter-clockwise to decrease the level of an audio input. A bar representation 502 displays a level of an audio input controlled by the control 102 adjustment.

Input page may enable users to adjust a panning of an audio input. For example, users may tap slider 503 assigned to the audio inputs and drag left or right to adjust the panning. By way of further example, users may enlarge slider 503 by double-tapping the slider 503 to make more detailed adjustments.

Input page may enable users to select an output to directly monitor the audio inputs. For example, users may tap one of buttons 504 to select an output to monitor the corresponding audio input. Each of the buttons 504 corresponds to one of the outputs. After the button selection, audio signal from an audio input will be sent directly to the selected output.

Input page may enable users to stereo link audio inputs when using a stereo audio source (e.g., drum machine, keyboard, etc.). For example, users may tap a corresponding button 505 in user interface 500 to stereo link audio inputs.

Figure 6:
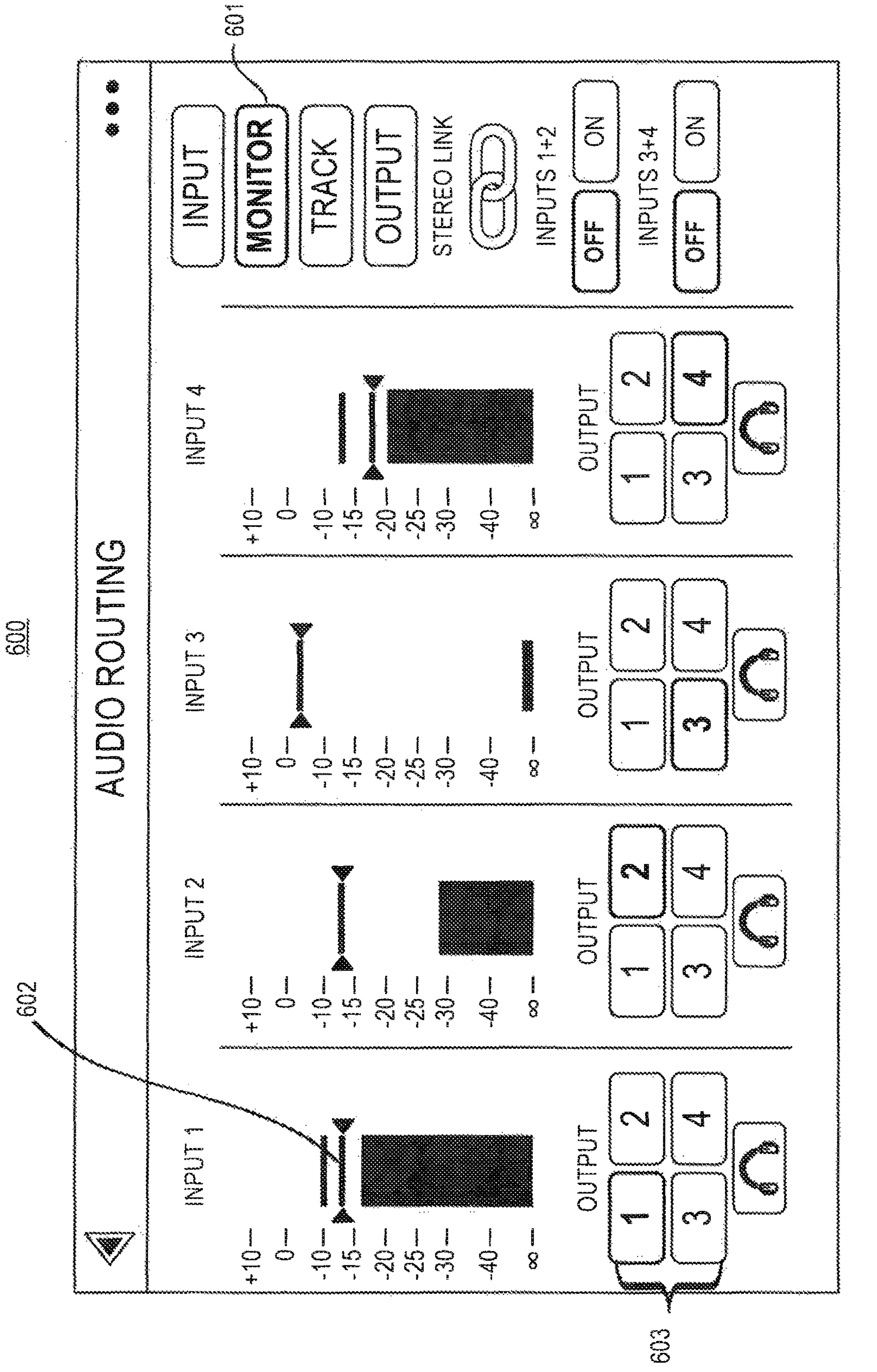
FIG. 6 shows an exemplary user interface of the guitar pedalboard of FIG. 1 displaying a page for listening to audio inputs while recording, overdubbing, and playing back loops.

FIG. 6 shows an exemplary user interface 600 of the pedalboard 100 displaying a page for listening to audio inputs while recording, overdubbing, and playing back loops. Pedalboard 100 may generate and Monitor page (e.g., FIG. 6) by receiving a press on icon 601. The Monitor page, in some embodiments, enables users to control the level of each audio input, as well as which output that the user would like to monitor audio inputs on. For example, pedalboard 100 may capture settings based on configurations made on the user interface 600. The user interface 600 may be configured by a user's finger on a presence sensitive input mechanism (e.g., a touch-screen device).

Monitor page may enable users to adjust a monitor level of an audio input. For example, users may tap and drag a line representation 602 to adjust a monitor level of each audio input.

Monitor page may enable users to select an output for monitoring the audio input. For example, users may tap one of buttons 603 to select an output to monitor the corresponding audio input. Each of the buttons 603 corresponds to one of the outputs. After the button selection, audio signal from an audio input will be sent directly to the selected output.

Figure 7:
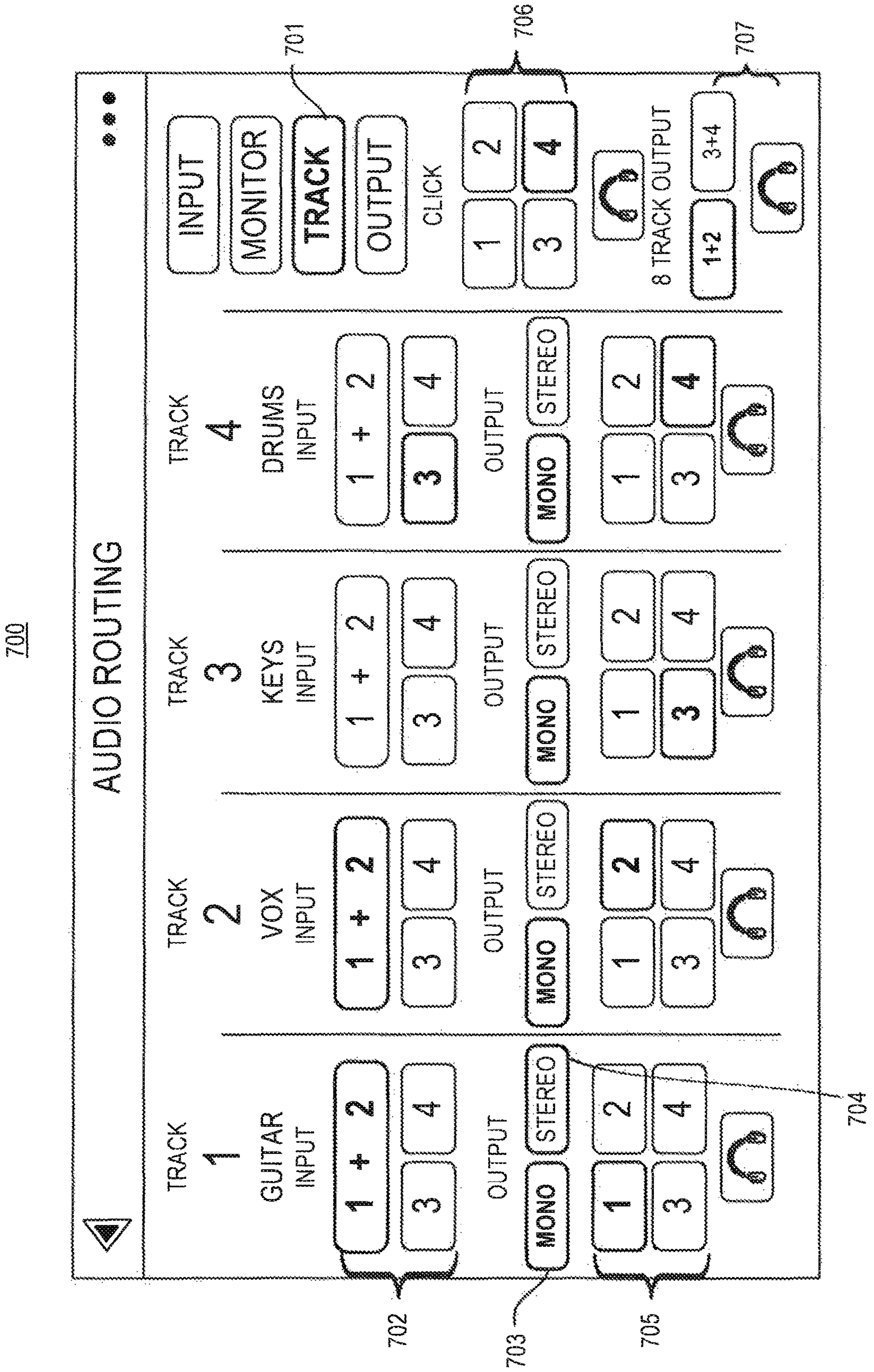
FIG. 7 shows an exemplary user interface of the guitar pedalboard of FIG. 1 displaying a page for setting tracks.

FIG. 7 shows an exemplary user interface 700 of the pedalboard 100 displaying a page for setting tracks. Pedalboard 100 may generate a Track page (e.g., FIG. 7) by receiving a press on icon 701. The Track page, in some embodiments, enables users to set configurations for tracks. The configurations may include routing an audio input to a track, selecting a track output mode, routing a track to an output, routing a click to an output, and selecting routing for the stereo backing track. For example, pedalboard 100 may capture settings based on configurations made on the user interface 700. The user interface 700 may be configured by a user's finger on a presence sensitive input mechanism (e.g., a touch-screen device).

Track page may enable users to route an audio input to a track. For example, users may tap one of buttons 702 to route an audio input to the corresponding track. Each of the buttons 702 corresponds to one of the audio inputs. After the button selection, audio signal from the selected audio input will be routed to the corresponding track.

Track page may enable users to select a track output mode. For example, users may tap button 703 or button 704 to select a track output mode for the corresponding track. The button 703 may represent monoaural and the button 704 may represent binaural.

Track page may enable users to route a track to an output. For example, users may tap one of buttons 705 to route a track to output corresponding to the selected button. If the output mode is binaural, multiple outputs will be selected together.

Track page may enable users to route a click to an output. For example, users may tap one of buttons 706 to route a click to an output corresponding to the selected button.

Track page may enable users to select routing for the stereo backing track. For example, users may tap one of buttons 707 to route a backing track to an output corresponding to the selected button.

Output Setup

Figure 8:
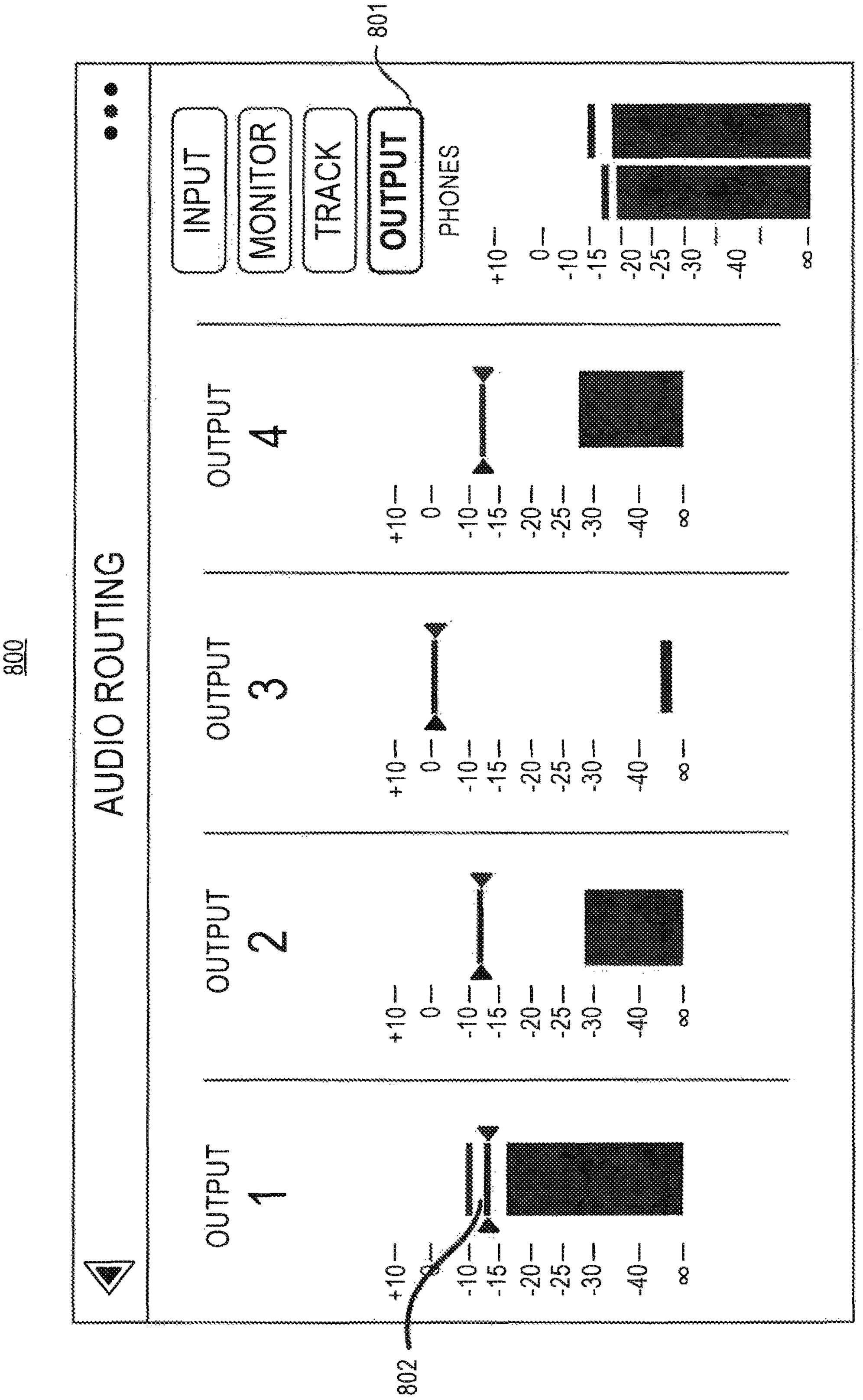
FIG. 8 shows an exemplary user interface of the guitar pedalboard of FIG. 1 displaying a page for adjusting an output level of an individual output.

FIG. 8 shows an exemplary user interface 800 of the pedalboard 100 displaying a page for adjusting an output level of an individual output. Pedalboard 100 may generate an Output page (e.g., FIG. 8) by receiving a press on icon 801. The Output page, in some embodiments, enables users to set configurations for outputs. For example, pedalboard 100 may capture adjusted output level of an individual output based on the position of a line representation 802 on the user interface 800. The position of the line representation 802 may be adjusted by tapping and dragging the line representation.

Figure 9:
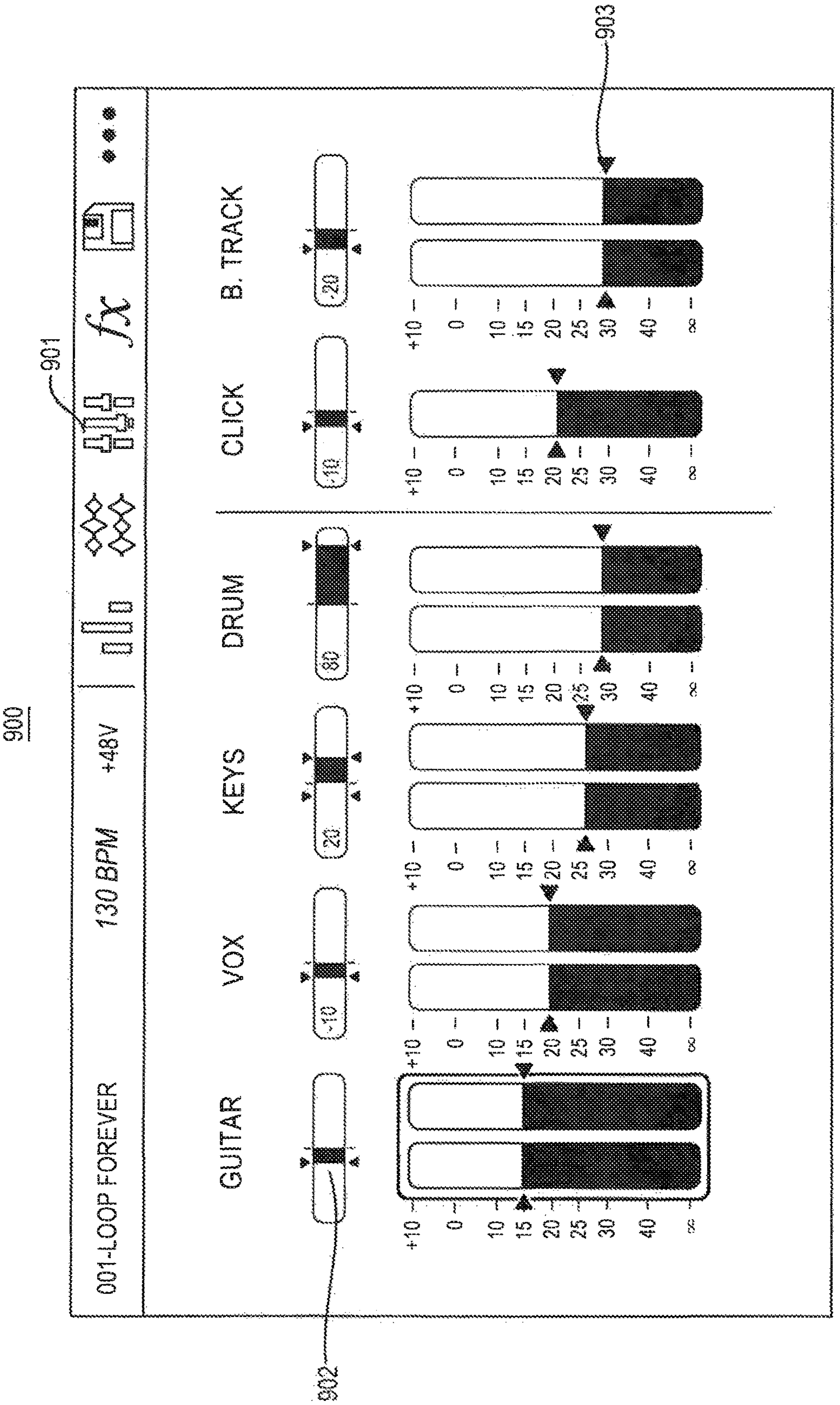
FIG. 9 shows an exemplary user interface of the guitar pedalboard of FIG. 1 for adjusting the volume and stereo balance of each track.

FIG. 9 shows an exemplary user interface 900 of the pedalboard 100 for adjusting the volume and stereo balance of each track. Pedalboard 100 may generate a Mixer page (e.g., FIG. 9) by receiving a press on icon 901. The Mixer page, in some embodiments, enables users to adjust the volume and stereo balance of each track. For example, pedalboard 100 may capture adjusted stereo balance of each track based on a configuration of slider 902. By way of further example, a pedalboard 100 may capture adjusted volume of each track based on a configuration of bar representation 903. Users may touch and drag slider 902 and bar representation 903 for adjustments. The users may also double-tap the slider 902 for fine adjustment.

FIGS. 10-11 and 13-15 show exemplary methods of using the functions of pedalboard 100 to edit and toggle tracks of a loop and audio inputs independently and simultaneously as described in FIGS. 2-9.

Figure 10:
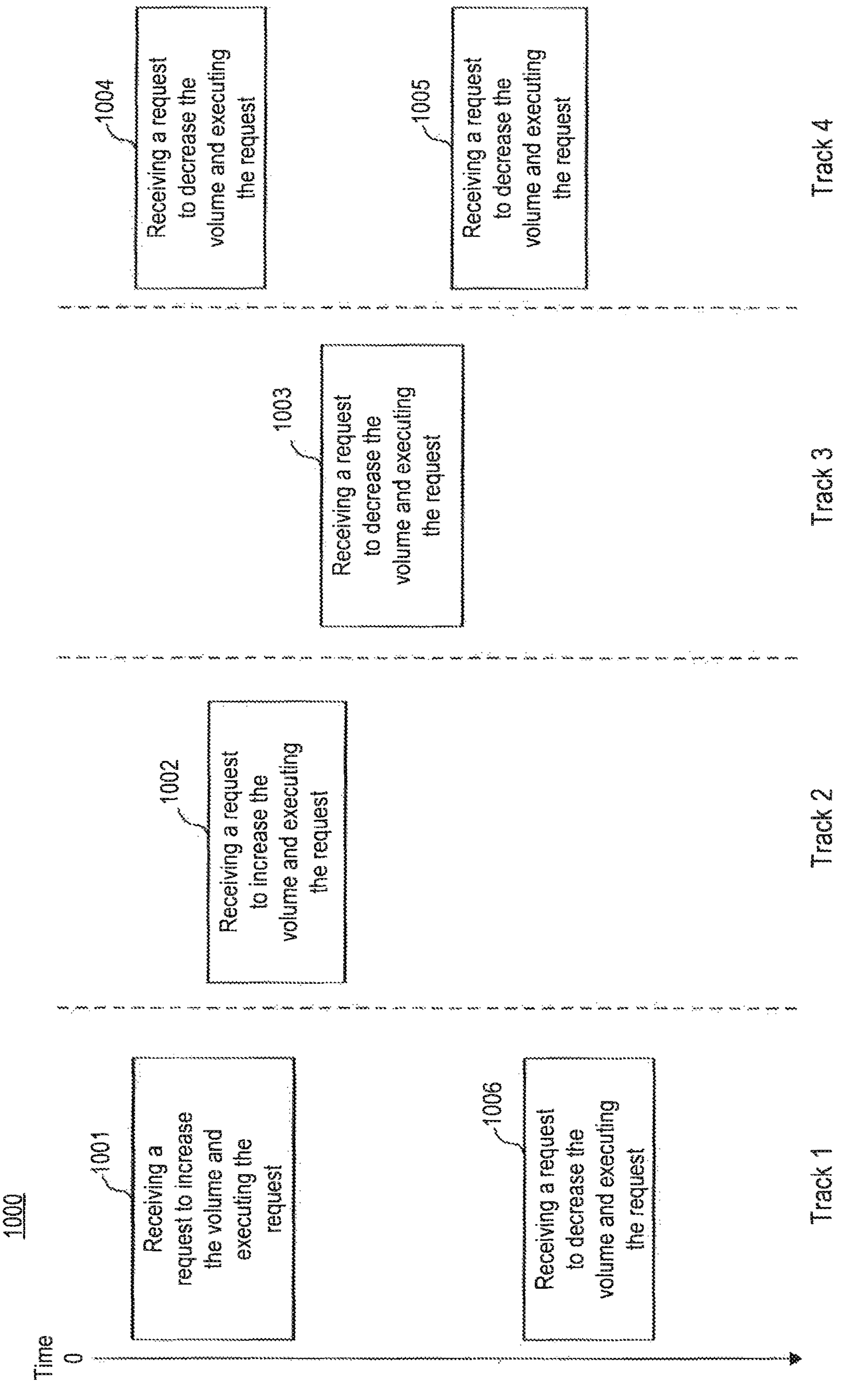
FIG. 10 is an exemplary flow chart of process for adjusting volumes of four tracks independently from each other on the guitar pedalboard of FIG. 1.

FIG. 10 is an exemplary flow chart of process 1000 for adjusting volumes of four tracks independently from each other on the pedalboard 100 in FIG. 1. While FIG. 10 illustrates performing different adjustments on four tracks, one of ordinary skill in the art will recognize that other configurations are possible.

In step 1001, pedalboard 100 may receive a request (e.g., received on a user interface in FIG. 2) to increase volume of Track 1 and execute the received request. For example, pedalboard 100 may capture a user input for increasing a volume of Track 1 and adjust the volume of Track 1 as captured.

In step 1002, pedalboard 100 may receive a request to increase a volume of Track 2 and execute the received request independently from the executed operation in step 1001 for Track 1. For example, pedalboard 100 may capture a user input for increasing a volume of Track 2 and adjust the volume of Track 2 while not interfering with the increased volume of Track 1 from step 1001.

In step 1003, pedalboard 100 may receive a request to decrease a volume of Track 3 and execute the received request independently from the executed operations in step 1001 & 1002 for Track 1 & 2. For example, pedalboard 100 may capture a user input for decreasing a volume of Track 3 and adjust the volume of Track 3 while not interfering with the volumes of Track 1 & 2.

In step 1004, pedalboard 100 may receive a request to decrease a volume of Track 4 and execute the received request independently and simultaneously from the executed operation in step 1001 for Track 1. For example, pedalboard 100 may capture a user input for decreasing a volume of Track 4 and adjust the volume of Track 4 independently and simultaneously from the adjusting volume of Track 1 in step 1001.

In step 1005, pedalboard 100 may receive a request to further decrease the volume of Track 4 and execute the received request independently from the executed operations in previous steps for other tracks. For example, pedalboard 100 may capture a user input for decreasing a volume of Track 4 and adjust the volume of Track 4 while not interfering with the volumes of other tracks.

In step 1006, pedalboard 100 may receive a request to decrease the volume of Track 1 and execute the received request independently from the executed operations in previous steps for other tracks. For example, pedalboard 100 may capture a user input for decreasing a volume of Track 1 and adjust the volume of Track 1 while not interfering with the volumes of other tracks.

Figure 11:
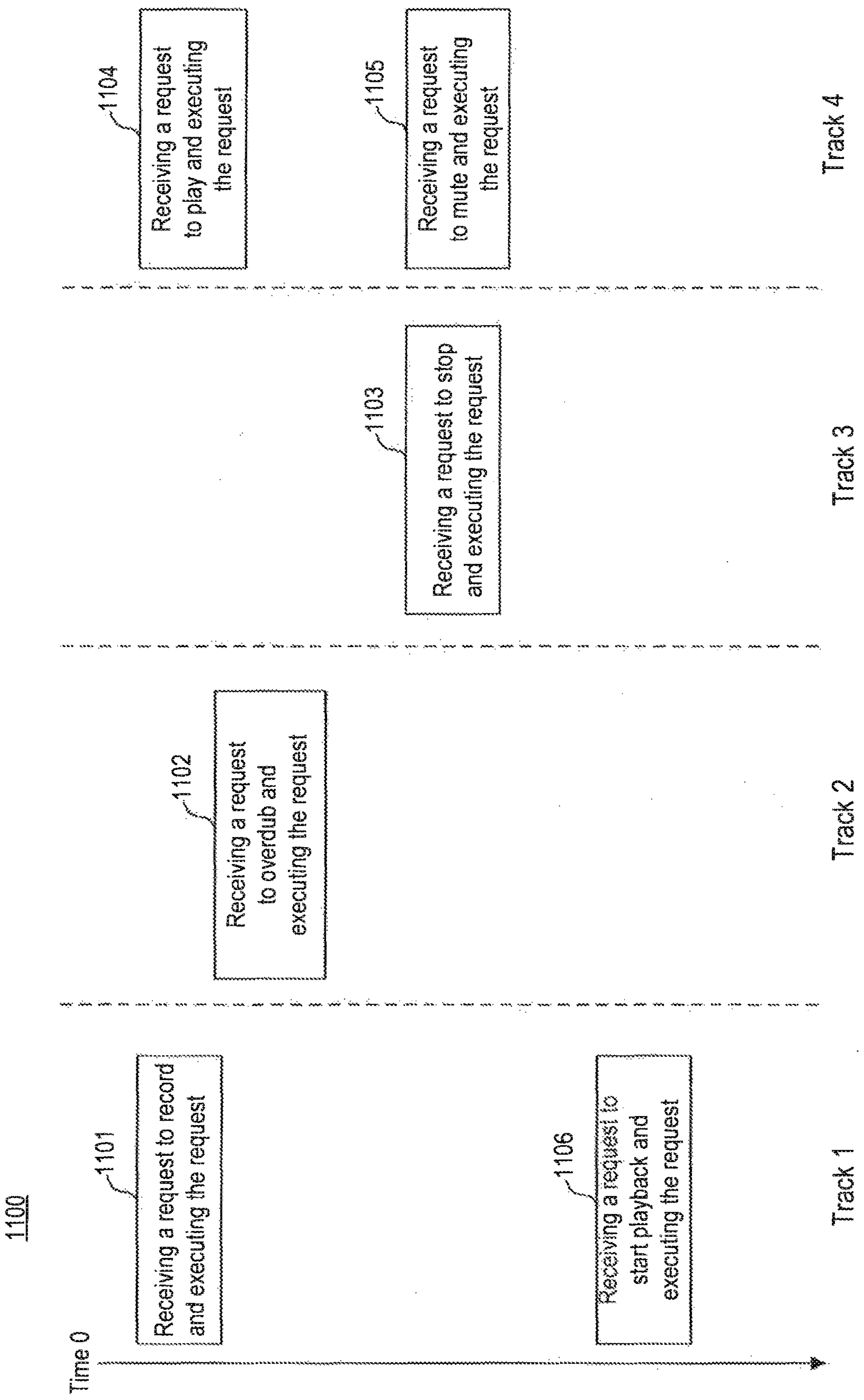
FIG. 11 is an exemplary flow chart of process for performing transactions on tracks independently from each other on the guitar pedalboard of FIG. 1.

FIG. 11 is an exemplary flow chart of process 1100 for performing transactions on tracks independently from each other on the pedalboard 100 in FIG. 1. While FIG. 11 illustrates performing different transactions on four tracks, one of ordinary skill in the art will recognize that other configurations are possible.

In step 1101, pedalboard 100 may receive a request (e.g., received on a switch) to record Track 1 and execute the received request. Musical instruments such as keyboard, guitar, drum machine, microphone, etc. may be plugged in to the pedalboard 100 for recording. For example, pedalboard 100 may capture a user input for recording Track 1 from audio input 2 which is connected to the drum machine and record the Track 1.

In step 1102, pedalboard 100 may receive a request to overdub Track 2 and execute the received request independently from the executed operation in step 1101 for Track 1. For example, pedalboard 100 may capture a user input for overdubbing Track 2 and start overdubbing Track 2 while recording Track 1 in step 1101.

In step 1103, pedalboard 100 may receive a request to stop playing Track 3 and execute the received request independently from the executed operations in step 1101 & 1102 for Track 1 & 2. For example, pedalboard 100 may capture a user input for stop playing Track 3 and stop Track 3 while recording Track 1 and overdubbing Track 2.

In step 1104, pedalboard 100 may receive a request to play Track 4 and start playing Track 4 independently and simultaneously from the executed operation in 1101 for Track 1. For example, pedalboard 100 may capture a user input for playing Track 4 and start playing Track 4 while start recording Track 1 in step 1101.

In step 1105, pedalboard 100 may receive a request to mute Track 4 and execute the received request independently from the executed operations in previous steps for other tracks. For example, pedalboard 100 may capture a user input for muting Track 4 and start muting Track 4 while not interfering with the operations of Track 1, 2, and 3.

In step 1106, pedalboard 100 may receive a request to finish recording and start playback of Track 1 and execute the received request independently from the executed operations in previous steps for other tracks. For example, pedalboard 100 may capture a user input for finish recording and start playback of Track 1 and start executing the captured input while not interfering with the operations of Track 2, 3, and 4.

FIGS. 12A-D show exemplary methods for applying various track modes to the tracks of a loop as described in FIG. 3. Pedalboard 100 may receive a track modes configuration by receiving a press on one of buttons 304-308 in FIG. 3.

Figure 12A:
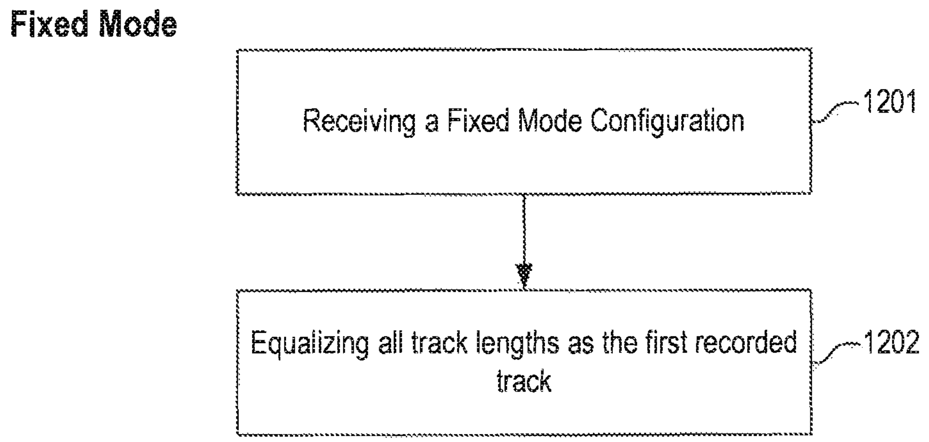
FIG. 12A shows an exemplary method for applying Fixed mode to the tracks.

FIG. 12A shows an exemplary method for applying Fixed mode to the tracks. In step 1201, pedalboard 100 may receive a Fixed mode configuration. In step 1202, pedalboard 100 may equalize all track lengths as the first recorded track. For example, after receiving a Fixed mode configuration, all tracks in a loop will have a same length.

Figure 12B:
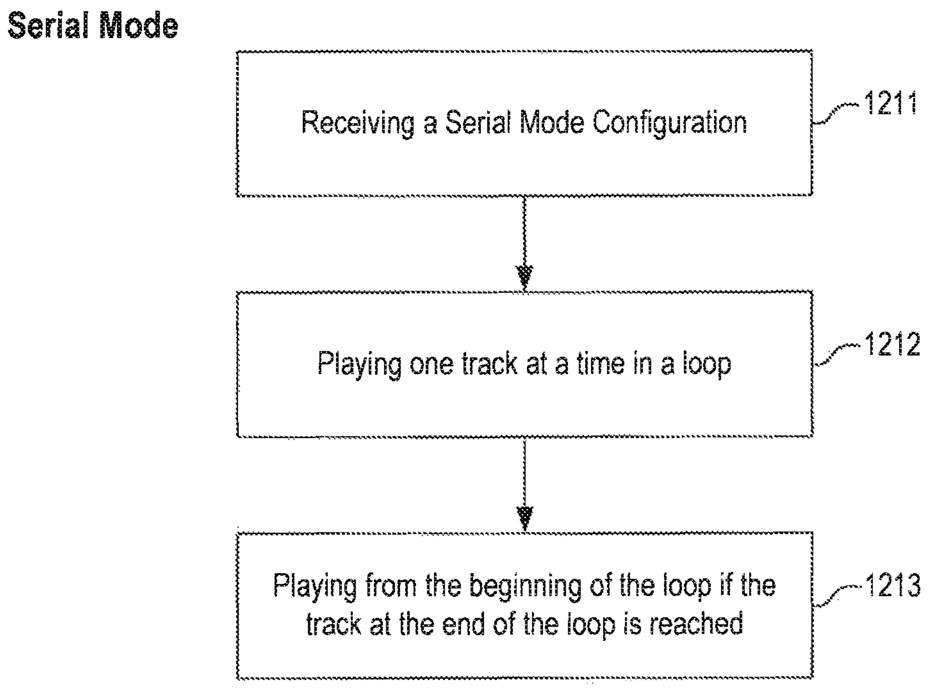
FIG. 12B shows an exemplary method for applying Serial mode to the tracks.

FIG. 12B shows an exemplary method for applying Serial mode to the tracks. In step 1211, pedalboard 100 may receive a Serial mode configuration. In step 1212, pedalboard 100 may start playing one track at a time in a loop. In step 1213, if end of the loop is reached, pedalboard 100 may play from the beginning of the loop again.

Figure 12C:
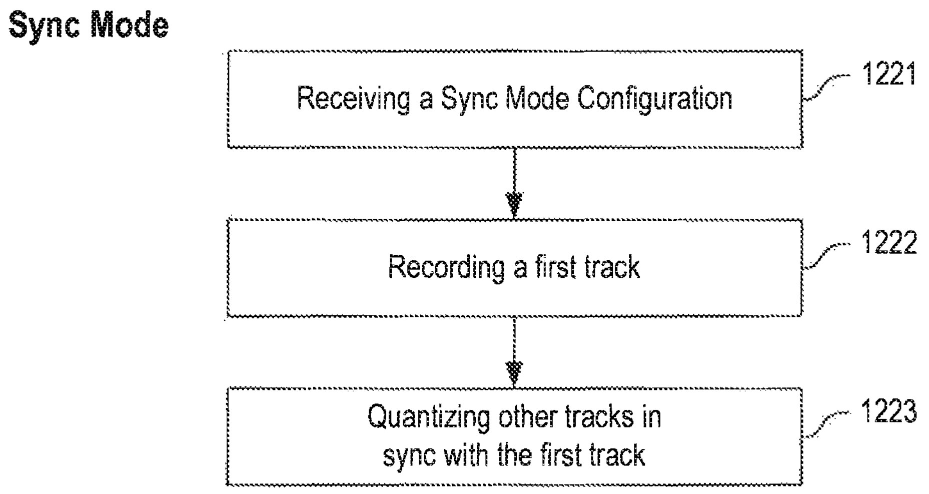
FIG. 12C shows an exemplary method for applying Sync mode to the tracks.

FIG. 12C shows an exemplary method for applying Sync mode to the tracks. In step 1221, pedalboard 100 may receive a Sync mode configuration. In step 1222, pedalboard 100 may record a first track. In step 1223, pedalboard 100 may quantize other tracks in sync with the first track.

Figure 12D:
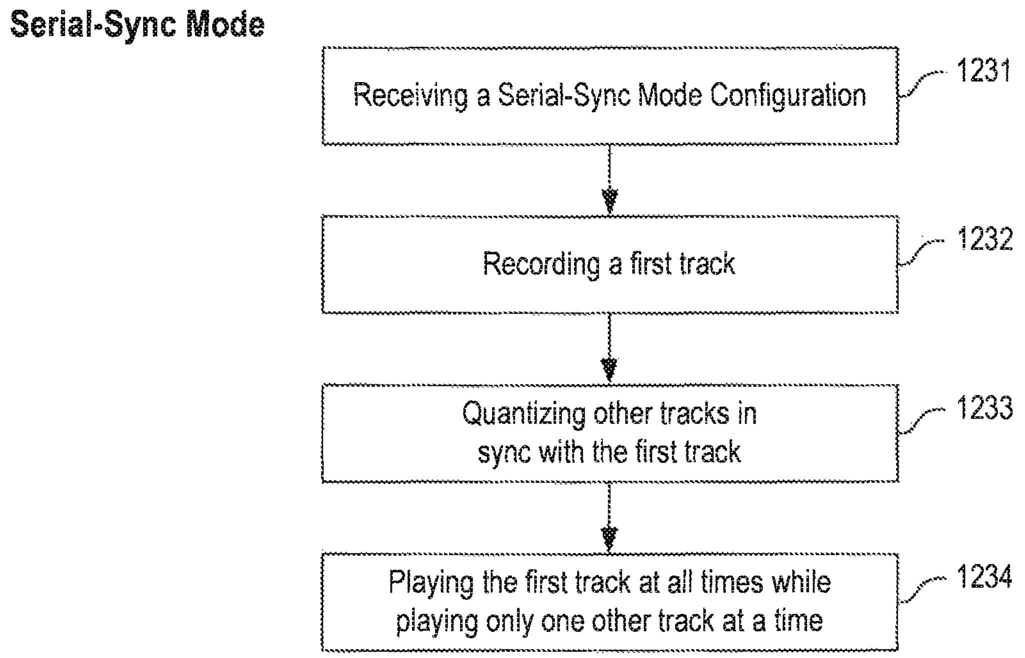
FIG. 12D shows an exemplary method for applying Serial-Sync mode to the tracks.

FIG. 12D shows an exemplary method for applying Serial-Sync mode to the tracks. Serial-Sync mode is similar to Serial Mode, but it enables users to keep one track (e.g., a drum or percussion track) playing at all time while switching between different song section on other tracks (e.g., verse, chorus, and bridge). In step 1231, pedalboard 100 may receive a Serial-Sync mode configuration. In step 1232, pedalboard 100 may record a first track. In step 1233, pedalboard 100 may quantize other tracks in sync with the first track. In step 1234, pedalboard 100 may play the first track at all time while playing only one other track at a time.

Figure 13:
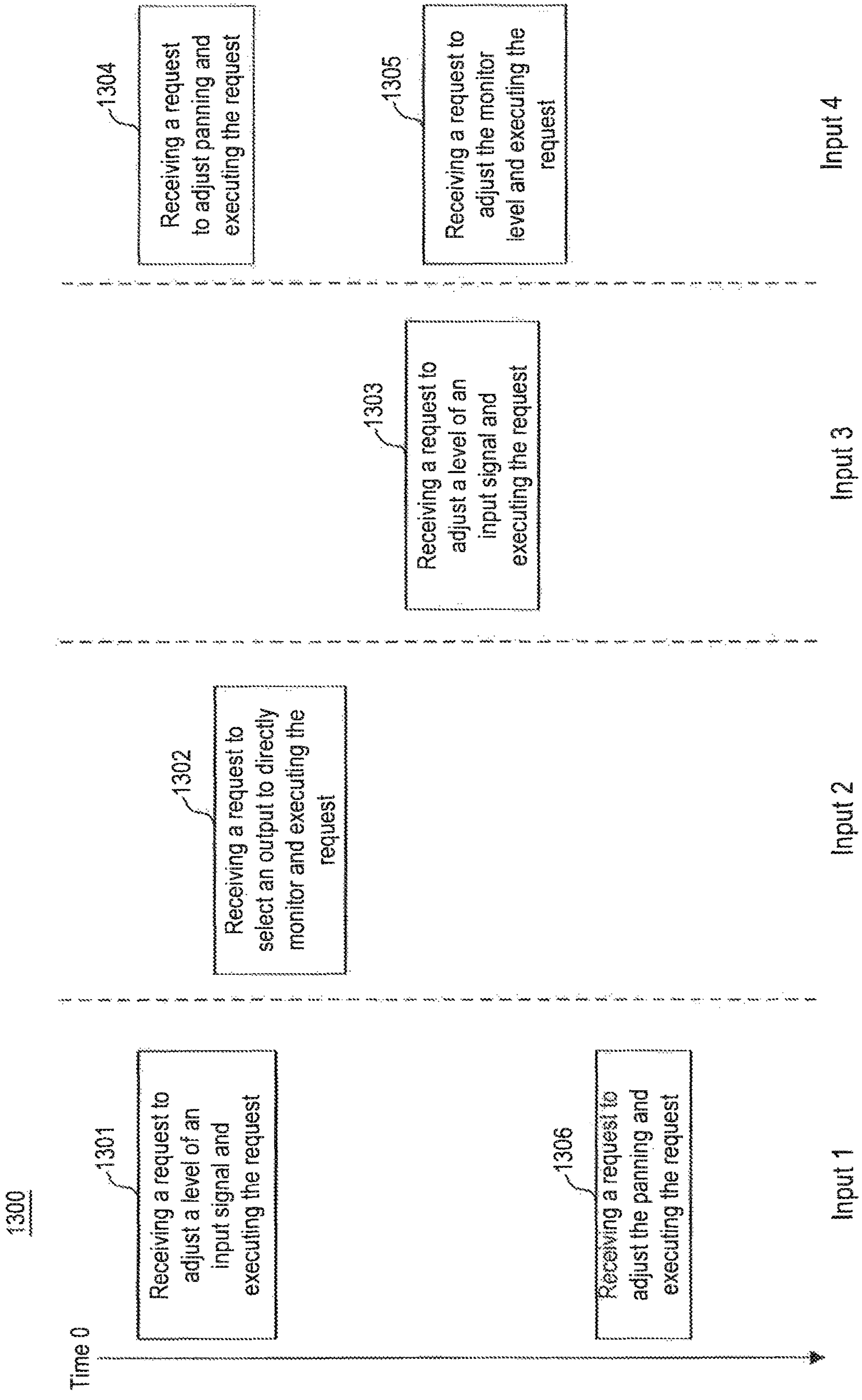
FIG. 13 is an exemplary flow chart of process to control audio inputs.

FIG. 13 is an exemplary flow chart of process 1300 to control audio inputs. The audio inputs may be independently edited and toggled on the user interfaces presented in FIG. 5 and FIG. 6. The illustrated Input 1, 2, 3, and 4 in FIG. 13 represent four audio inputs. While FIG. 13 illustrates configuring four audio inputs, one of ordinary skill in the art will recognize that other configurations are possible.

In step 1301, pedalboard 100 may receive a request (e.g., received on a configurable knob 102 in FIG. 1) to adjust a level of an input signal for Input 1. For example, pedalboard 100 may capture a user input for adjusting a level of an input signal of Input 1 and execute the adjustment.

In step 1302, pedalboard 100 may receive a request (e.g., received on a user interface in FIG. 5) to select an output to directly monitor Input 2 and execute the received request independently from the executed operation in step 1301 for Input 1. For example, pedalboard 100 may capture a user input for selecting an output to directly monitor Input 2 and start monitoring Input 2 on the selected output while adjusting the level of an input signal of Input 1 in step 1301.

In step 1303, pedalboard 100 may receive a request to adjust a level of an input signal for Input 3 and execute the received request independently from the executed operations in step 1301 & 1302 for Input 1 & 2. For example, pedalboard 100 may capture a user input for adjusting a level of an input signal for Input 3 and start making adjustment while not interfering with the operations of Input 1 and 2.

In step 1304, pedalboard 100 may receive a request to adjust a panning for Input 4 and execute the adjustment independently and simultaneously from the executed operation in 1301 for Input 1. For example, pedalboard 100 may capture a user input for adjusting a panning for Input 4 and start making adjustment while adjusting a level of an input signal for Input 1 in step 1301.

In step 1305, pedalboard 100 may receive a request to adjust a level of an input signal for Input 4 and execute the received request independently from the executed operations in previous steps for other inputs. For example, pedalboard 100 may capture a user input for adjusting a level of an input signal for Input 4 and start adjusting on Input 4 while not interfering with the operations of Input 1, 2, and 3.

In step 1306, pedalboard 100 may receive a request to adjust a panning of an input signal for Input 1 and execute the received request independently from the executed operations in previous steps for other inputs. For example, pedalboard 100 may capture a user input for adjusting a panning of an input signal for Input 1 and start adjusting while not interfering with the operations of Input 2, 3, and 4.

Figure 14:
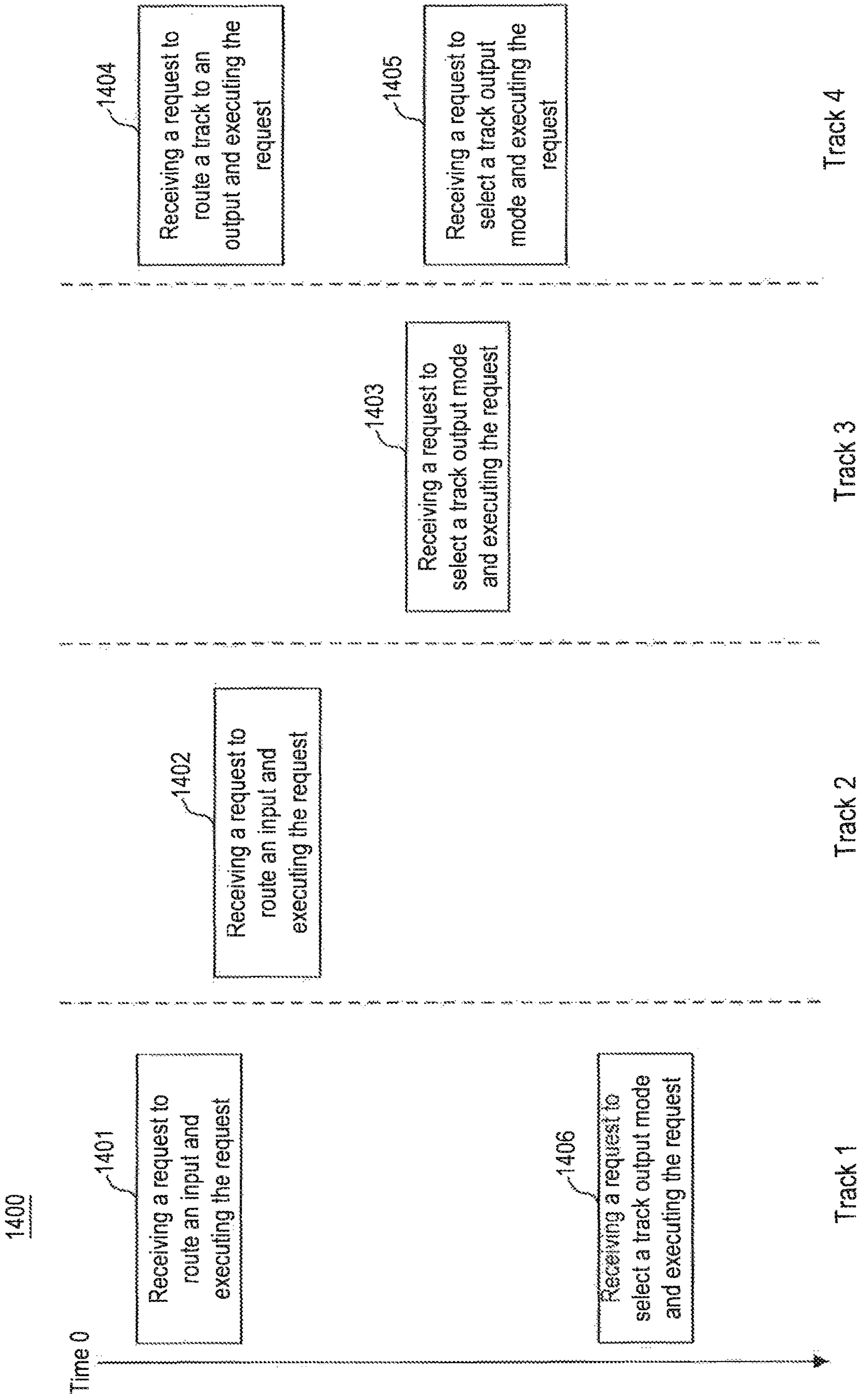
FIG. 14 is an exemplary flow chart of process for configuring setups for tracks independently from each other on the guitar pedalboard of FIG. 1.

FIG. 14 is an exemplary flow chart of process 1400 for configuring setups for tracks independently from each other on the pedalboard 100 in FIG. 1. While FIG. 14 illustrates performing different setups on four tracks, one of ordinary skill in the art will recognize that other configurations are possible.

In step 1401, pedalboard 100 may receive a request (e.g., received on a user interface in FIG. 7) to route an audio input to Track 1 and execute the received request. For example, pedalboard 100 may capture a user input for routing an audio input to Track 1 and start routing the input to Track 1.

In step 1402, pedalboard 100 may receive a request to route an audio input to Track 2 and execute the received request independently from the executed operation in step 1401 for Track 1. For example, pedalboard 100 may capture a user input for routing an audio input to Track 2 and start routing the input to Track 2 while not interfering with the routing of Track 1 in step 1401.

In step 1403, pedalboard 100 may receive a request to select a track output mode for Track 3 and execute the received request independently from the executed operations in step 1401 and 1402 for Track 1 and 2. For example, pedalboard 100 may capture a user input for selecting a track output mode for Track 3 and execute the selected output mode on Track 3 while not interfering with the operations of Track 1 and 2.

In step 1404, pedalboard 100 may receive a request to route Track 4 to an output and execute the received request independently and simultaneously from the executed operation in step 1401 for Track 1. For example, pedalboard 100 may capture a user input for routing Track 4 to an output and start routing Track 4 to the output independently and simultaneously from the routing of audio input for Track 1 in step 1401.

In step 1405, pedalboard 100 may receive a request to select a track output mode for Track 4 and execute the received request independently from the executed operations in previous steps for other tracks. For example, pedalboard 100 may capture a user input for selecting a track output mode for Track 4 and apply the selected output mode on Track 4 while not interfering with the operations of other tracks.

In step 1406, pedalboard 100 may receive a request to select a track output mode for Track 1 and execute the received request independently from the executed operations in previous steps for other tracks. For example, pedalboard 100 may capture a user input for selecting a track output mode for Track 1 and apply the selected output mode on Track 1 while not interfering with the operations of other tracks.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the pedalboard, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles “a” and “an” mean “one or more.” Similarly, the use of a plural term does not necessarily denote a plurality unless it is unambiguous in the given context. Words such as “and” or “or” mean “and/or” unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A guitar pedalboard for creating a loop comprising:

a touch screen display for displaying a plurality of tracks, wherein the touch screen display can be used to adjust a parameter of each of the plurality of tracks;

a plurality of footswitches corresponding to the plurality of tracks, wherein the footswitches can be used to independently record and play each of the plurality of tracks; and one or more processors operatively coupled to the touch screen display and the plurality of footswitches and configured to simultaneously play, in synchronization, more than one loop each comprising a subset of the plurality of tracks.

2. The guitar pedalboard of claim 1, where the parameter is a volume of each track.

3. The guitar pedalboard of claim 1, wherein the display is adapted to enable recording, overdubbing, or playing the tracks simultaneously.

4. The guitar pedalboard of claim 1, wherein the display is adapted to enable recording, overdubbing, or playing only one track at a time.

5. The guitar pedalboard of claim 1, wherein the display is adapted to enable syncing the tracks.

6. The guitar pedalboard of claim 1, wherein the display is adapted to enable:

syncing the tracks;

playing a first track; and recording, overdubbing, or playing one track at a time.

7. The guitar pedalboard of claim 1, wherein the display is adapted to enable assigning multiple effects to an audio input or the tracks.

8. The guitar pedalboard of claim 1, wherein the display is adapted to cause a processor to perform one or more instructions comprising:

adjusting a level or panning of audio inputs, selecting an output to directly monitor audio inputs, or stereo linking audio inputs.

9. The guitar pedalboard of claim 1, wherein the display is adapted to cause a processor to perform one or more instructions comprising:

adjusting a volume of audio inputs, or selecting outputs for monitoring audio inputs.

10. The guitar pedalboard of claim 1, wherein the display is adapted to cause a processor to perform one or more instruction comprising:

routing one or more audio inputs to a track, routing a track to an output, or selecting a track output mode.

11. The guitar pedalboard of claim 1, wherein the one or more processors are configured to:

simultaneously play, in synchronization, the more than one loop each comprising the subset of the plurality of tracks in a first operational mode; and in response to receiving a trigger for a second operational mode during playback of a respective loop, play the more than one loop in the second operational mode after the respective loop ends.

12. A method for creating a loop comprising:

using a touch screen to display a plurality of tracks, wherein the touch screen display can be used to adjust a parameter of each of the plurality of tracks;

using a plurality of footswitches corresponding to the plurality of tracks to independently record and play each of the plurality of tracks; and using one or more processors operatively coupled to the touch screen display and the plurality of footswitches to simultaneously play, in synchronization, more than one loop each comprising a subset of the plurality of tracks.

13. The method of claim 12, further comprising using the display to cause a processor to adjust volumes of the tracks.

14. The method of claim 12, further comprising using the display to cause a processor to record, overdub, or play the tracks simultaneously.

15. The method of claim 12, further comprising using the display to cause a processor to record, overdub, or play only one track at a time.

16. The method of claim 12, further comprising using the display to cause a processor to sync the tracks.

17. The method of claim 12, further comprising using the display to cause a processor to:

sync the tracks;

play a first track; and record, overdub, or play one track at a time.

18. The method of claim 12, further comprising using the display to cause a processor to assign multiple effects to an audio input or the tracks.

19. The method of claim 12, further comprising using the display to cause a processor to perform one or more instructions comprising:

adjusting a level or panning of audio inputs, selecting an output to directly monitor audio inputs, or stereo linking audio inputs.

20. The method of claim 12, further comprising using the display to cause a processor to perform one or more instructions comprising:

adjusting a volume of audio inputs, or selecting outputs for monitoring audio inputs.

21. The method of claim 12, further comprising using the display to cause a processor to perform one or more instructions comprising:

routing one or more audio inputs to a track, routing a track to an output, or selecting a track output mode.

* * * * *